US011913094B2

(12) United States Patent
Charbon et al.

(10) Patent No.: US 11,913,094 B2
(45) Date of Patent: *Feb. 27, 2024

(54) SPIRAL SPRING FOR A HOROLOGICAL MOVEMENT

(71) Applicant: Nivarox-FAR S.A., Le Locle (CH)

(72) Inventors: Christian Charbon, Chézard-St-Martin (CH); Lionel Michelet, Fleurier (CH); Marco Verardo, Les Bois (CH)

(73) Assignee: Nivarox-FAR S.A., Le Locle (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/654,875

(22) Filed: Mar. 15, 2022

(65) Prior Publication Data

US 2022/0298611 A1 Sep. 22, 2022

(30) Foreign Application Priority Data

Mar. 16, 2021 (EP) .................................... 21162936

(51) Int. Cl.
*C22C 27/02* (2006.01)
*G04B 17/06* (2006.01)

(52) U.S. Cl.
CPC .......... *C22C 27/025* (2013.01); *G04B 17/066* (2013.01)

(58) Field of Classification Search
None
See application file for complete search history.

(56) References Cited

U.S. PATENT DOCUMENTS

| | | | | |
|---|---|---|---|---|
| 5,881,026 A * | 3/1999 | Baur | G04B 17/227 148/501 |
| 2007/0133355 A1 | 6/2007 | Hara et al. | |
| 2018/0373202 A1 | 12/2018 | Charbon | |
| 2022/0298610 A1* | 9/2022 | Charbon | C22C 14/00 |

FOREIGN PATENT DOCUMENTS

| | | | |
|---|---|---|---|
| CH | 714 494 A2 | 6/2019 |
| JP | 2005-140674 A | 6/2005 |
| JP | 2019-7955 A | 1/2019 |
| RU | 2 696 327 C1 | 8/2019 |
| RU | 2 696 809 C1 | 8/2019 |
| RU | 2 697 060 C1 | 8/2019 |
| RU | 2 715 832 C1 | 3/2020 |
| RU | 2 727 354 C1 | 7/2020 |
| WO | WO 2005/045532 A2 | 5/2005 |
| WO | WO 2005/045532 A3 | 5/2005 |
| WO | WO 2015189278 A3 | 12/2015 |

OTHER PUBLICATIONS

European Seach Report dated Aug. 4, 2021 in European Application 21162936.5, filed on Mar. 16, 2021, 3 pages (with English Translation of Categories of cited documents).
Russian Office Action and Search Report dated Oct. 26, 2022 in Russian Patent Application No. 2022106606/28(013698) (with English language translation), 14 pages.
Notice of the Reason for Refusal dated Feb. 7, 2023 in Japanese Patent Application No. 2022-039952 (with English language translation), 17 pages.
Notice of Grounds for Rejection dated Dec. 13, 2023, in KR Patent Application No. 10-2022-0031544 with English translation.

* cited by examiner

*Primary Examiner* — Brian D Walck
(74) *Attorney, Agent, or Firm* — Oblon, McClelland, Maier & Neustadt, L.L.P.

(57) ABSTRACT

A spiral spring is configured to equip a balance of a horological movement. The spiral spring is made of an alloy consisting of: Nb, Ti and at least one element selected from V and Ta, optionally at least one element selected from Zr and Hf, optionally at least one element selected from W and Mo, possible traces of other elements selected from O, H, C, Fe, N, Ni, Si, Cu, Al, with the following weight percentages: a total content of Nb, V and Ta comprised between 40 and 85%, a total content of Ti, Zr and Hf comprised between 15 and 55%, a content for W and Mo respectively comprised between 0 and 2.5%, a content for each of the elements selected from O, H, C, Fe, N, Ni, Si, Cu, Al between 0 and 1600 ppm with the sum of the traces less than or equal to 0.3% by weight.

17 Claims, No Drawings

SPIRAL SPRING FOR A HOROLOGICAL MOVEMENT

CROSS-REFERENCE TO RELATED APPLICATION

This application claims priority to European Patent Application No. 21162936.5 filed on Mar. 16, 2021, the entire disclosure of which is hereby incorporated herein by reference.

FIELD OF THE INVENTION

The invention relates to a spiral spring intended to equip a balance of a horological movement. It also relates to the manufacturing method of this spiral spring.

BACKGROUND OF THE INVENTION

The manufacture of spiral springs for watchmaking must face constraints that are often incompatible at first sight:

need to obtain a high elastic limit,
ease of production, in particular drawing and rolling,
excellent fatigue resistance,
stable performance over time,
small sections.

The alloy selected for a spiral spring must also have properties guaranteeing the maintenance of chronometric performance despite the variation in the temperatures of use of a watch incorporating such a spiral spring. The thermoelastic coefficient, also called TEC, of the alloy is then of great significance. To form a chronometric oscillator with a CuBe or nickel silver balance, a TEC of ±10 ppm/° C. must be achieved.

The formula that links the TEC of the alloy and the expansion coefficients of the spiral (α) and the balance (β) to the thermal coefficient (TC) of the oscillator is as follows:

$$TC = \frac{dM}{dT} = \left(\frac{1}{2E}\frac{dE}{dT} - \beta + \frac{3}{2}\alpha\right) \times 86400 \frac{s}{j°C}$$

the variables M and T being respectively the rate in s/d and the temperature in ° C., E being the Young's modulus of the spiral spring with (1/E. dE/dT) which is the TEC of the spiral alloy, the expansion coefficients being expressed in ° $C.^{-1}$.

Practically, the TC is calculated as follows:

$$TC = \frac{(M_{38°C} - M_{8°C})}{30}$$

with a value which must be comprised between −0.6 and +0.6 s/d° C.

Spiral springs for watchmaking are known from the prior art which are made of binary Nb—Ti alloys with percentages by weight of Ti typically comprised between 40 and 60% and more specifically with a percentage of 47%. With an adapted deformation and heat treatment diagram, this spiral spring has a two-phase microstructure including niobium in the beta phase and titanium in the form of precipitates in the alpha phase. Cold-worked Nb in the beta phase has a strongly positive TEC while Ti in the alpha phase has a strongly negative TEC allowing the two-phase alloy to be brought to a TEC close to zero, which is particularly favourable for the TC.

However, there are some disadvantages when using Nb—Ti binary alloys for spiral springs. The Nb—Ti binary alloy is particularly favourable for low TC as mentioned above. On the other hand, its composition is not optimised for the secondary error which is a measure of the curvature of the rate which is approximated above by a straight line passing through two points (8° C. and 38° C.). The rate can deviate from this linear behaviour between 8° C. and 38° C. and the secondary error at 23° C. is a measure of this deviation at the temperature of 23° C. Typically, for an NbTi47 alloy, the secondary error is 4.5 s/d whereas preferably it should be comprised between −3 and +3 s/d.

Another disadvantage of binary Nb—Ti alloys is related to the precipitation of titanium which takes place mainly after the winding step during the fixing step. This step is crucial because it allows to fix the shape of the spiral and to obtain the TC close to zero following the precipitation of Ti. In practice, precipitation times are very long with, for an NbTi47 alloy, times comprised between 8 and 30 hours and on average around 20 hours, which significantly increases production times. Apart from the problem of high production times, too high percentage of titanium can lead to the formation of fragile martensitic phases which make it difficult, if not impossible, to deform the material for the production of a spiral spring. It is therefore advisable not to incorporate too much titanium into the alloy.

To date, there is still a need for new chemical compositions fulfilling the various criteria of absence of fragile phases, reduction of production times and reduction of secondary error while maintaining a low TC for the production of spiral springs.

SUMMARY OF THE INVENTION

The object of the invention is to propose a new chemical composition for a spiral spring allowing to overcome the aforementioned disadvantages.

To this end, the invention relates to a watch spiral spring made from an at least ternary alloy with a base of niobium and titanium. According to the invention, the Nb is partly replaced by Ta and/or V so as to reduce the secondary error. Advantageously, the Ti is partly replaced by Zr and/or Hf so as to accelerate the precipitation, or in other words to increase the driving force of precipitation, during fixing while maintaining the same TC. Furthermore, the presence of at least three elements in a significant proportion in the alloy allows to improve the mechanical properties and in particular the elastic limit of the alloy.

More specifically, the present invention relates to a spiral spring intended to equip a balance of a horological movement, said spiral spring being made from an at least ternary alloy consisting of:

Nb, Ti and at least one element selected from V and Ta,
optionally at least one element selected from Zr and Hf,
optionally at least one element selected from W and Mo,
possible traces of other elements selected from O, H, C, Fe, N, Ni, Si, Cu, Al, the percentages by weight of the various elements being as follows:

a total content of Nb, V and Ta comprised between 40 and 85%,
a total content of Ti, Zr and Hf comprised between 15 and 55%,
a content for W and Mo respectively comprised between 0 and 2.5%, a content for each of said elements selected from O, H, C, Fe, N, Ni, Si, Cu, Al comprised between 0 and 1600 ppm with the sum of said traces less than or equal to 0.3% by weight.

Preferably, the content by weight of Nb is greater than 45% in order to obtain a sufficient percentage of beta phase having a strongly positive TEC intended to be compensated by the negative TEC of the alpha phase of Ti, Zr, Hf.

Preferably, the content by weight of Ti is at least 15%.

The invention also relates to the method for manufacturing this watch spiral spring.

Other features and advantages of the invention will appear upon reading the detailed description below.

DETAILED DESCRIPTION

The invention relates to a watch spiral spring made of an at least ternary alloy including niobium and titanium and one or more additional elements.

According to the invention, this alloy consists of:

Nb, Ti and at least one element selected from V and Ta, optionally at least one element selected from Zr and Hf, optionally at least one element selected from W and Mo, possible traces of other elements selected from O, H, C, Fe, N, Ni, Si, Cu, Al, with the following weight percentages for a total of 100%:

a total content of Nb, V and Ta comprised between 40 and 85% with preferably an Nb content greater than 45%, or even greater than or equal to 50%, a total content of Ti, Zr and Hf comprised between 15 and 55% with preferably a minimum Ti content of 15%, a content for W and Mo respectively comprised between 0 and 2.5%, a content for each of said elements selected from O, H, C, Fe, N, Ni, Si, Cu, Al comprised between O and 1600 ppm with the sum of said traces less than or equal to 0.3% by weight.

According to the invention, the Nb is partly replaced by Ta and/or V. The partial replacement of Nb by Ta and/or V is intended to reduce the secondary error. Tests were performed on binary Nb—V and Nb—Ta alloys to show the effect of V and Ta respectively on the secondary error. The secondary error is measured at 23° C. This is the difference in rate at 23° C. with respect to the straight line linking the rate at 8° C. to that at 38° C. For example, the rate at 8° C., 23° C. and 38° C. can be measured using a Witschi chronoscope-type apparatus.

Table 1 below shows reference data for pure Nb, pure V, pure Ta and the NbTi47 alloy and the values obtained as a function of the percentage by weight of V and Ta in a binary alloy Nb—V and Nb—Ta respectively. Pure Nb has a secondary error at 23° C. of −6.6 s/d. The precipitation of Ti in the alpha phase in the NbTi47 alloy compensates for the negative effect of Nb with, however, an excessive rise with a value reaching 4.5 s/d, that is to say a delta of 11.1 s/d, following the addition of Ti. Pure vanadium and pure tantalum have a significantly more negative secondary error than pure Nb with values of −24.9 and −28.7 s/d respectively. The partial replacement of Nb by V and/or Ta allows to lower the secondary error to negative values less than −7 s/d. Thus, the increasing replacement of Nb by V or Ta ranging from 5% to 25% lowers the secondary error from about −7 s/d to −12 s/d. Nb can thus be replaced by V or Ta or by a combination of V and Ta to reach this range of values. The secondary error is comprised between −7 s/d and −12 s/d for a content of Ta alone, of V alone or a total content of Ta and V comprised between 5% and 25% by weight. Preferably, the secondary error is comprised between −9 and −12 s/d for a content of Ta alone, of V alone or a total content of Ta and V comprised between 10 and 25% and more preferably between 15 and 25% by weight. The addition in the Nb—V/Ta alloy of one or more elements forming an alpha phase of precipitates during the fixing step allows to compensate for this negative value and to reach a value close to 0 s/d. Preferably, the content of the element(s) forming an alpha phase of precipitates is comprised for all of these elements between 15 and 55% by weight. The element forming an alpha phase is at least Ti with preferably a minimum content of 15%. It may, in addition to Ti, be Hf and/or Zr which forms with Ti a single alpha phase of precipitates during the fixing step. When the alloy comprises Zr and/or Hf, the total content of Zr and Hf is comprised between 1 and 40%, preferably between 5 and 25%, more preferably between 10 and 25%, even more preferably between 15 and 25% by weight.

TABLE 1

| Alloy: | % weight V/Ta | Secondary error at 23° C. |
|---|---|---|
| Pure Niobium | | −6.6 s/d |
| Pure Vanadium | | −24.9 s/d |
| Pure Tantalum | | −28.7 s/d |
| NbTi47 | | 4.5 s/d |
| $Nb_{100}$ | 0% | −6.6 s/d |
| $Nb_{95}V_5$ | 5% | −7.2 s/d |
| $Nb_{90}V_{10}$ | 10% | −8.6 s/d |
| $Nb_{85}V_{15}$ | 15% | −9.0 s/d |
| $Nb_{80}V_{20}$ | 20% | −11.0 s/d |
| $Nb_{75}V_{25}$ | 25% | −11.5 s/d |
| $Nb_{100}$ | 0% | −6.6 s/d |
| $Nb_{95}Ta_5$ | 5% | −8.0 s/d |
| $Nb_{90}Ta_{10}$ | 10% | −8.7 s/d |
| $Nb_{85}Ta_{15}$ | 15% | −10.5 s/d |
| $Nb_{80}Ta_{20}$ | 20% | −11.6 s/d |
| $Nb_{75}Ta_{25}$ | 25% | −12.0 s/d |

The alloy may further include W and Mo in a content by weight for each comprised between 0 and 2.5% in order to increase the Young's modulus of the alloy, which allows for a given torque of the spring to reduce the thickness of the spiral and thereby lighten the spiral.

In a particularly advantageous manner, the alloy used in the present invention does not comprise other elements except for possible and unavoidable traces.

More particularly, the oxygen content is less than or equal to 0.10% by weight of the total, or even less than or equal to 0.085% by weight of the total.

More particularly, the carbon content is less than or equal to 0.04% by weight of the total, in particular less than or equal to 0.020% by weight of the total, or even less than or equal to 0.0175% by weight of the total.

More particularly, the iron content is less than or equal to 0.03% by weight of the total, in particular less than or equal to 0.025% by weight of the total, or even less than or equal to 0.020% by weight of the total.

More particularly, the nitrogen content is less than or equal to 0.02% by weight of the total, in particular less than or equal to 0.015% by weight of the total, or even less than or equal to 0.0075% by weight of the total.

More particularly, the hydrogen content is less than or equal to 0.01% by weight of the total, in particular less than or equal to 0.0035% by weight of the total, or even less than or equal to 0.0005% by weight of the total.

More particularly, the silicon content is less than or equal to 0.01% by weight of the total.

More particularly, the nickel content is less than or equal to 0.01% by weight of the total, in particular less than or equal to 0.16% by weight of the total.

More particularly, the copper content is less than or equal to 0.01% by weight of the total, in particular less than or equal to 0.005% by weight of the total.

More particularly, the aluminium content is less than or equal to 0.01% by weight of the total.

Advantageously, this spiral spring has a multi-phase microstructure including a single beta phase of niobium, vanadium and/or tantalum and a single alpha phase of titanium, and hafnium and/or zirconium when the alloy includes hafnium and/or zirconium. In the presence of tantalum and vanadium, the microstructure could also include an intermetallic of the type $TaV_2$. To obtain such a microstructure, it is necessary to precipitate the alpha phase (Ti, Hf, Zr) by heat treatment as described below.

The spiral spring produced with this alloy has an elastic limit greater than or equal to 500 MPa and more precisely between 500 and 1000 MPa. Advantageously, it has a modulus of elasticity greater than or equal to 100 GPa and preferably greater than or equal to 110 GPa.

The invention also relates to the method for manufacturing the watch spiral spring, characterised in that the following steps are implemented successively:

a) production or provision of a blank made of an alloy consisting of:

Nb, Ti and at least one element selected from V and Ta, optionally at least one element selected from Zr and Hf, optionally at least one element selected from W and Mo, possible traces of other elements selected from O, H, C, Fe, N, Ni, Si, Cu, Al, with the following weight percentages for a total of 100%:

- a total content of Nb, V and Ta comprised between 40 and 85% with preferably an Nb content greater than 45%,
- a total content of Ti, Zr and Hf comprised between 15 and 55% with preferably a minimum Ti content of 15% (limit included),
- a content for W and Mo respectively comprised between 0 and 2.5%.
- a content for each of said elements selected from O, H, C, Fe, N, Ni, Si, Cu, Al comprised between 0 and 1600 ppm with the sum of said traces less than or equal to 0.3% by weight, b) beta type quenching of said blank, so that titanium, and zirconium and hafnium when they are present, of said alloy is essentially in the form of a solid solution with niobium as well as tantalum and/or vanadium in the beta phase;

c) application to said alloy of deformation sequences followed by heat treatment. Deformation means a deformation by drawing and/or rolling. Drawing may require the use of one or more dies during the same sequence or during different sequences if necessary. The drawing is carried out until a wire with a round section is obtained. Rolling can be performed in the same deformation sequence as the drawing or in another sequence. Advantageously, the last sequence applied to the alloy is a rolling preferably with a rectangular profile compatible with the entry section of a winding pin.

d) winding to form a spiral spring, followed by a final fixing heat treatment.

In these coupled deformation-heat treatment sequences, each deformation is carried out with a given deformation amount comprised between 1 and 5, this deformation amount corresponding to the conventional formula 2 ln(d0/d), wherein d0 is the diameter of the last beta quenching, and where d is the diameter of the cold-worked wire. The global accumulation of the deformations on the whole of this succession of sequences brings a total deformation amount comprised between 1 and 14. Each coupled deformation-heat treatment sequence includes, each time, a heat treatment of precipitation of the alpha phase (Ti, Zr and/or Hf).

The beta quenching prior to the deformation and heat treatment sequences is a dissolution treatment, with a duration comprised between 5 minutes and 2 hours at a temperature comprised between 700° C. and 1000° C., under vacuum, followed by cooling under gas. Even more particularly, this beta quenching is a dissolution treatment, lasting 1 hour at 800° C. under vacuum, followed by cooling under gas.

To return to the coupled deformation-heat treatment sequences, the heat treatment is a precipitation treatment with a duration comprised between 1 hour and 200 hours at a temperature comprised between 300° C. and 700° C. More particularly, the duration is comprised between 5 hours and 30 hours with a holding temperature comprised between 400° C. and 600° C.

More particularly, the method includes between one and five coupled deformation-heat treatment sequences.

More particularly, the first coupled deformation-heat treatment sequence includes a first deformation with at least 30% reduction in section.

More particularly, each coupled deformation-heat treatment sequence, other than the first, includes one deformation between two heat treatments with at least 25% reduction in section.

More particularly, after this production of said alloy blank, and before the deformation-heat treatment sequences, in an additional step, a surface layer of ductile material taken from copper, nickel, cupro-nickel, cupro-manganese, gold, silver, nickel-phosphorus Ni—P and nickel-boron Ni—B, or the like is added to the blank to facilitate shaping into a wire shape during deformation. And, after the deformation-heat treatment sequences or after the winding step, the wire is stripped of its layer of ductile material, in particular by chemical attack.

Alternatively, the surface layer of ductile material is deposited so as to form a spiral spring whose pitch is not a multiple of the thickness of the blade. In another variant, the surface layer of ductile material is deposited so as to form a spring whose pitch is variable.

In a particular horological application, ductile material or copper is thus added at a given moment to facilitate shaping into a wire shape, so that a thickness of 10 to 500 micrometres remains on the wire with the final diameter of 0.3 to 1 millimetres. The wire is stripped of its layer of ductile material or copper in particular by chemical attack, then is rolled flat before the manufacture of the actual spring by winding.

The supply of ductile material or copper can be galvanic, or else mechanical, it is then a jacket or a tube of ductile material or copper which is adjusted on an alloy bar with a large diameter, then which is thinned during the steps of deformation of the composite rod.

The removal of the layer is in particular possible by chemical attack, with a solution based on cyanides or based on acids, for example nitric acid.

The final heat treatment is carried out for a duration comprised between 1 hour and 200 hours at a temperature comprised between 300° C. and 700° C. More particularly, the duration is comprised between 5 hours and 30 hours at a holding temperature comprised between 400° C. and 600° C. During this final heat treatment, the precipitation of the alpha phase is finalised. In the presence of hafnium and/or zirconium, the final treatment time can be reduced by a few hours with typically a precipitation time comprised between 4 and 8 hours at a holding temperature comprised between 400° C. and 600° C.

By a suitable combination of sequences of deformation and heat treatment, it is possible to obtain a very fine microstructure, which is in particular nanometric, composed of the beta phase of niobium, tantalum and/or vanadium and of the alpha phase of titanium, and zirconium and/or hafnium if the alloy contains one or two of these last two elements. This alloy combines a very high elastic limit, greater than at least 500 MPa and a modulus of elasticity greater than or equal to 100 GPa. This combination of properties is well suited for a spiral spring. In addition, this alloy according to the invention can easily be covered with ductile material or copper, which greatly facilitates its deformation by drawing.

An alloy of an at least ternary type including niobium, titanium, tantalum and/or vanadium of the type selected above for implementing the invention also has an effect similar to that of "Elinvar", with a practically zero thermoelastic coefficient in the range of temperatures commonly used in watches, and adapted for the manufacture of self-compensating spirals.

The invention claimed is:

1. A spiral spring configured to equip a balance of a horological movement, wherein the spiral spring is made of an alloy consisting of:

Nb;
Ti; and
V and/or Ta;
optionally, Zr;
optionally, Hf;
optionally, W;
optionally, Mo; and
optionally O, H, C, Fe, N, Ni, Si, Cu, and/or Al,
wherein a Ti content is at least 15 wt. %,
wherein a total content of the Nb, V, and Ta is in a range of from 40 to 85 wt. %,
wherein a total content of the Ti, Zr, and Hf is in a range of from 15 to 55 wt. %,
wherein a W content is in a range of from 0 to 2.5 wt. %,
wherein a Mo content is in a range of from 0 to 2.5 wt. %,
wherein a content for each of O, H, C, Fe, N, Ni, Si, Cu, and Al in a range of from 0 to 1600 ppm,
wherein a sum of the O, H, C, Fe, N, Ni, Si, Cu, and Al, is less than or equal to 0.3 wt. %, and
wherein the spiral spring has a modulus of elasticity of at least 110 GPa.

2. The spiral spring of claim 1, wherein the Nb content is greater than 45 wt. %.

3. The spiral spring of claim 1, wherein the Ti content is greater than or equal to 30 wt. %.

4. The spiral spring of claim 1, wherein a sum of the V and Ta is in a range of from 5 to 25 wt. %.

5. The spiral spring of claim 1, wherein a sum of V and Ta is in a range of from 10 to 25 wt. %.

6. The spiral spring of claim 1, wherein a sum of the V and Ta is in a range of from 15 to 25 wt. %.

7. The spiral spring of claim 1, wherein the Zr and/or Hf are present, and wherein a sum of the Zr and Hf is in a range of from 1 to 40 wt. %.

8. The spiral spring of claim 1, wherein the Zr and/or Hf are present, and wherein a sum of the Zr and Hf is in a range of from 5 to 25 wt. %.

9. The spiral spring of claim 1, wherein the Zr and/or Hf are present, and wherein a sum of the Zr and Hf is in a range of from 10 to 25 wt %.

10. The spiral spring of claim 1, wherein the Zr and/or Hf are present, and wherein sum of the content of Zr and Hf is in a range of from 15 to 25 wt. %.

11. The spiral spring of claim 1, having a microstructure comprising a beta phase of (i) Nb, and of (ii-a) V and/or (ii-b) Ta, and
an alpha phase of (iii) Ti, and of (iii-a) Zr and/or of (iii-b) Hf when the alloy comprises Zr and/or Hf.

12. The spiral spring of claim 1, having an elastic limit greater than or equal to 500 MPa.

13. A method for manufacturing the spiral spring of claim 1, the method successively comprising:

beta type quenching a blank of the alloy, which is at least ternary, so that titanium of the alloy is essentially a solid solution with niobium, and vanadium and/or tantalum in beta phase, zirconium and/or hafnium of the alloy also being essentially a solid solution when the alloy comprises the zirconium and/or hafnium;
applying to the alloy a succession of sequences of deformation followed by an intermediate heat treatment;
winding to form the spiral spring;
applying a final heat treatment.

14. The method of claim 13, wherein the beta type quenching is a dissolution treatment, with a duration in a range of from 5 minutes to 2 hours at a temperature in a range of from 700 to 1000° C. under vacuum, followed by cooling under gas.

15. The method of claim 13, wherein the final heat treatment as well as the intermediate heat treatment of each sequence is a precipitation treatment of Ti, and optionally of Zr and/or Hf when the alloy comprises the Zr and/or Hf, in the alpha phase, with a duration in a range of from 1 to 200 hours at a holding temperature in a range of from 300 to 700° C.

16. The method of claim 13, wherein, when the alloy comprises the Zr and/or Hf, the final heat treatment is carried out at a holding temperature in a range of from 400 to 600° C. for a duration in a range of from 4 to 8 hours.

17. The method of claim 13, wherein, before the applying of the succession of sequences, a surface layer of ductile material comprising copper, nickel, cupro-nickel, cupro-manganese, gold, silver, nickel-phosphorus Ni—P, and/or nickel-boron Ni—B, is added to the blank to facilitate shaping into a wire, and wherein, before or after the winding, the wire is chemically stripped of the surface layer of the ductile material.

* * * * *